(12) United States Patent
Werner et al.

(10) Patent No.: US 11,097,608 B2
(45) Date of Patent: Aug. 24, 2021

(54) METHOD FOR MANUFACTURING A SOLENOID-ARMATURE RAM COMPOSITE AND A SOLENOID-ARMATURE RAM COMPOSITE FOR A LINEAR ACTUATOR

(71) Applicant: RAPA Automotive GmbH & Co. KG, Selb (DE)

(72) Inventors: Michael Werner, Selb (DE); Markus Franz, Selb (DE)

(73) Assignee: RAPA Automotive GmbH & Co. KG, Selb (DE)

( * ) Notice: Subject to any disclaimer, the term of this patent is extended or adjusted under 35 U.S.C. 154(b) by 63 days.

(21) Appl. No.: 16/123,170

(22) Filed: Sep. 6, 2018

(65) Prior Publication Data

US 2019/0070946 A1     Mar. 7, 2019

(30) Foreign Application Priority Data

Sep. 7, 2017   (DE) ...................... 10 2017 120 627.2

(51) Int. Cl.
  *B60K 5/12*     (2006.01)
  *H01F 7/16*     (2006.01)
  (Continued)

(52) U.S. Cl.
  CPC .......... *B60K 5/1283* (2013.01); *H01F 7/127* (2013.01); *H01F 7/1607* (2013.01); *H01F 7/1615* (2013.01); *H01F 7/1646* (2013.01); *H01F 41/0246* (2013.01); *H02K 41/02* (2013.01); *F01L 2810/03* (2013.01); *F16C 32/0468* (2013.01); *H01F 2007/086* (2013.01)

(58) Field of Classification Search
  CPC . B60K 5/1283; H01F 7/1615; H01F 41/0246; H01F 7/127; H01F 7/1646; H01F 7/1607; H01F 2007/086; H02K 41/02; F16C 32/0468; F01L 2810/03
  USPC ........................................ 310/12.24
  See application file for complete search history.

(56) References Cited

U.S. PATENT DOCUMENTS 3,851,285 A    11/1974 Rothfuss et al.
4,363,980 A *  12/1982 Petersen ................. G03B 9/32
                                                310/15

(Continued)

FOREIGN PATENT DOCUMENTS

DE           101 37 640 A1    2/2003
DE      10 2008 030 452 A1   12/2009

(Continued)

OTHER PUBLICATIONS

Cast, Definition of Cast by Merriam-Webster, printed on Jun. 23, 2020.*

*Primary Examiner* — John K Kim
(74) *Attorney, Agent, or Firm* — Maier & Maier, PLLC

(57) ABSTRACT

A method for manufacturing a solenoid-armature ram composite and a corresponding solenoid-armature ram composite for a linear actuator which has a stator with a coil that can be fed with electrical current for producing an electromagnetic field and a single-part or multi-part solenoid armature movable along a longitudinal axis of the coil and a ram connected with the solenoid armature, provides that the solenoid armature surrounds the ram in a ring shape and a gap between the ram and the solenoid armature is cast with a casting material.

9 Claims, 2 Drawing Sheets

(51) Int. Cl.
H02K 41/02 (2006.01)
H01F 7/127 (2006.01)
H01F 41/02 (2006.01)
F16C 32/04 (2006.01)
H01F 7/08 (2006.01)

(56) References Cited

U.S. PATENT DOCUMENTS

| | | | | |
|---|---|---|---|---|
| 6,105,943 A * | 8/2000 | Nagasawa | ............. | F16F 13/264 |
| | | | | 267/140.14 |
| 6,265,802 B1 * | 7/2001 | Getschmann | ........ | H02K 1/2713 |
| | | | | 310/156.34 |
| 6,717,305 B2 * | 4/2004 | Ruberl | .................... | B06B 1/045 |
| | | | | 310/12.24 |
| 6,952,060 B2 * | 10/2005 | Goldner | ............ | B60G 17/0157 |
| | | | | 310/12.13 |
| 7,946,025 B2 * | 5/2011 | Lindberg | ............ | F16C 32/0472 |
| | | | | 29/596 |
| 7,989,994 B2 * | 8/2011 | Iwasa | ..................... | H02K 41/03 |
| | | | | 310/14 |
| 8,487,485 B2 * | 7/2013 | Tang | .................... | H02K 41/031 |
| | | | | 310/12.18 |
| 2003/0034697 A1 * | 2/2003 | Goldner | ............. | B60G 17/0157 |
| | | | | 310/17 |
| 2005/0006971 A1 * | 1/2005 | Lindberg | ............. | H02K 41/031 |
| | | | | 310/95 |
| 2013/0020104 A1 * | 1/2013 | Takahashi | ............ | H02K 41/031 |
| | | | | 173/148 |
| 2013/0147583 A1 | 6/2013 | Schiepp et al. | | |
| 2016/0006333 A1 * | 1/2016 | Kemnitz | ............. | F16C 32/0472 |
| | | | | 310/12.04 |
| 2016/0336825 A1 * | 11/2016 | Kano | ................... | H02K 41/031 |
| 2019/0070946 A1 * | 3/2019 | Werner | ................. | H01F 7/1615 |

FOREIGN PATENT DOCUMENTS

| | | |
|---|---|---|
| DE | 20 2011 052 220 U1 | 5/2013 |
| DE | 10 2013 202 166 A1 | 8/2014 |
| DE | 10 2014 200 647 A1 | 7/2015 |
| EP | 0 284 634 A1 | 10/1988 |

* cited by examiner

METHOD FOR MANUFACTURING A SOLENOID-ARMATURE RAM COMPOSITE AND A SOLENOID-ARMATURE RAM COMPOSITE FOR A LINEAR ACTUATOR

FIELD

The present invention on the one hand relates to a method for manufacturing a solenoid-armature ram composite for a linear actuator and on the other hand relates to a solenoid-armature ram composite for a linear actuator, in particular for utilization for a vehicle engine.

BACKGROUND

In vehicles, so-called active engine mounts can find application to improve comfort. By means of an active engine mount, undesirable vibrations and a noise transmission to the interior of the vehicle caused thereby can be suppressed. Undesirable vibrations can occur for example when one or several cylinders in an engine fail or are switched off, for which reason the engine can run out of round. For this purpose, an active engine mount has a control for one or several actuators in order to counteract the vibrations of the engine with the aid of the actuators in the manner known to the person skilled in the art.

As actuators, linear actuators can be used in particular. These typically have a stator with a coil that can be fed with electrical current for producing an electromagnetic field and a solenoid armature movable along a longitudinal axis of the coil. The solenoid armature is usually connected with a ram. The solenoid armature can surround the ram in a ring shape. Such an annular solenoid armature can consist of several parts in particular and can for example comprise a first and a second permanent magnet ring, between which an intermediate ring is attached, and a first and a second pole disk.

The force level of the linear actuator in a linear actuator with multi-part annular solenoid armature, in addition to the dependence on the radial air gap between the solenoid armature and the stator, depends on the circumference on which the force is generated, thus on the outer diameter of the armature, and on the volume of the permanent magnet rings.

From the document DE 10 2007 005 434 A1 a double-effect electromagnetic actuator is known, in particular for hydraulics and pneumatics applications, which comprises a coil and an annular solenoid armature arranged in the coil. The armature has two permanent magnets and a center disk arranged between the permanent magnets and, on the front side in an axial direction, respectively a pole disk manufactured from a ferromagnetic material. The specified parts of the armature are attached to a central armature rod directly, without an intermediate element. This arrangement and configuration of the armature is reasonable only in small actuators, since in large actuators with a high force level it causes a disproportionately high material consumption of the specified parts of the armature and accordingly high material costs.

In contrast, from the document DE 10 2014 200 647 A1 an electromagnetic, dynamic actuator for active aggregate mounts, in particular engine mounts, is known, which comprises a solenoid armature that is arranged displaceably relative to a stator along a longitudinal axis of a cylinder coil. A radial air gap is present between the solenoid armature and the stator. In comparison to an outer diameter of a ram extending along the longitudinal axis of the cylinder coil the solenoid armature has a larger inner diameter and is connected with the ram via an intermediate element.

Such an actuator can be manufactured with a larger outer diameter than the actuator known from the document DE 10 2007 005 434 A1, and can consequently generate a greater force, but its manufacture is elaborate and cost-intensive due to the intermediate element. For on the one hand, the mutually opposing radial areas of the components magnetic core/intermediate element and intermediate element/ram to be connected have to be worked, and on the other hand, the specified components have to be interconnected, wherein usually adhesive attachment methods are used and the components have to be mechanically fixated in an elaborate manner for this purpose. Moreover, the specified components are subject to certain production tolerances, so that a tolerance chain is created that has an influence on the width of the radial air gap, for which reason a negative influence on the force level of the actuator can arise.

SUMMARY

It is therefore the object of the present invention to make available on the one hand a method for the easy and cost-effective manufacture of a solenoid-armature ram composite for a linear actuator, in particular for utilization in a vehicle engine, and on the other hand a corresponding solenoid-armature ram composite for a cost-effective linear actuator.

The object is achieved by a method for manufacturing a solenoid-armature ram composite for a linear actuator and on the other hand by a solenoid-armature ram composite for a linear actuator having the features of the respective independent claim. Developments and advantageous embodiments are stated respectively in the dependent claims.

One aspect of the invention relates to a method for manufacturing a solenoid-armature ram composite for a linear actuator. The linear actuator contains a stator with a coil that can be fed with electrical current for producing an electromagnetic field and a single-part or multi-part solenoid armature movable along a longitudinal axis of the coil. The solenoid armature is connected with a ram, wherein the solenoid armature surrounds the ram in a ring shape. In a first step of the method the solenoid armature and the ram are arranged in an assembly mold such that there remains a radial gap between the solenoid armature and the ram. Here, an inner diameter of the assembly mold and an outer diameter of the solenoid armature are executed in mutually accurately fitting manner. This can be done by press fitting or clearance fitting that is as small as possible, for example an H7-g6 clearance fitting, or smaller. Typically, the inner diameter of the assembly mold is larger by 0.02 mm than the uppermost tolerance limit of the solenoid armature. In a second step the gap is cast with a casting material, so that the casting material establishes a connection between the solenoid armature and the ram. In a third step the solenoid-armature ram composite is removed from the assembly mold.

By the method underlying the invention, a solenoid-armature ram composite for a linear actuator is manufactured cost-effectively and easily, since merely the areas of the solenoid armature which face the stator have to be worked with accurate tolerances. A working with accurate tolerances of the areas of the solenoid armature facing the ram, the areas of the ram facing the solenoid armature and also of the connecting areas of an intermediate element no longer required now can be omitted, so that overall the manufacturing costs for the linear actuator are reduced, in which the solenoid-armature ram composite is used which is manufactured according to the method of the invention. Through the method of the invention also a tolerance chain is avoided that is present between the specified components in the state of the art, so that as a positive effect the radial air gap between the solenoid armature and the stator can have the smallest width possible, which results in an increase in the force level of the linear actuator.

Preferably, the solenoid armature comprises at least one first and one second permanent magnet ring, between which at least one intermediate ring is arranged, and a first and a second pole disk, which can be executed respectively in single-part or multi-part manner. The first and the second pole disk respectively adjoin one of the two permanent magnet rings on the outer side in the axial direction. Such annular solenoid armatures are particularly energy-efficient.

According to a special embodiment, the first pole disk is configured to expand over the full area, has a smaller inner diameter in comparison to the second pole disk and is arranged directly on the ram, wherein the first pole disk can be adhesively attached or preferably pressed onto the ram. Thereby the first pole disk serves as the bottom for the casting material when casting, thereby facilitating the removal of the solenoid-armature ram composite from the assembly mold.

Preferably, the pole disks and/or the intermediate ring consist of at least one material of the group of magnetically soft materials and can therefore be produced more easily and more cost-effectively than the permanent magnet rings usually consisting of a magnetically hard material.

Preferably, the permanent magnet rings are dimensioned to be smaller with respect to the outer diameter in comparison to the pole disks and/or the intermediate ring, so that the permanent magnet rings, which are more elaborate and difficult to produce than the pole disks and/or the intermediate ring, said permanent magnet rings typically likely having greater dimension and shape tolerances in manufacture, do not have an influence on the radial air gap of the linear actuator. Rather, the minimal width of the air gap is defined by the outer diameter of the pole disks and/or the intermediate ring which can be manufactured with accurate tolerance without much effort, so that small widths can be realized for the air gap.

Preferably, plate springs are attached to the solenoid-armature ram composite, in particular to the ram. The solenoid-armature ram composite equipped with the plate springs can subsequently be inserted in the stator such that the solenoid-armature ram composite is movably mounted on the stator by the plate springs. In comparison to other types of springs, such as compression springs, for example, plate springs have a relationship of construction space and stiffness that is favorable for utilization in a linear actuator. To be able to realize deflections in the millimeter range at required stiffnesses, a certain minimum outer diameter of the plate springs is required, however.

According to a further aspect of the invention the stator preferably has an axial cross-sectional profile that diminishes at least partly in the direction of the ram. Particularly preferably, the specified cross section of the stator has a cone-shaped profile. Thereby space is created in the central region of the linear actuator for the axial deflection of the plate springs, so that plate springs with a relatively large outer diameter in comparison to the construction size of the linear actuator can be utilized, said plate springs radially reaching beyond the solenoid armature. Thus on the one hand the stiffness and stroke range of the actor can be varied and on the other hand also actuators with high stiffness and stroke values can be constructed more compactly. Due to the compact construction type, the material consumption and accordingly the material cost in the manufacture of the stator are reduced, so that the linear actuator in which the stator according to the invention is used can be manufactured cost-effectively. This aspect of the invention is regarded as independently inventive with respect to the main aspect, i.e. also for the case that the connection between the solenoid armature and the ram is not established by a casting material, and even for the case that the solenoid armature does not surround the ram in a ring shape.

In this context an axial cross-sectional profile of the coil surrounded by the stator is preferred which likewise diminishes at least partly in the direction of the ram. Particularly preferably, the specified cross section of the coil again has a cone-shaped profile. Through such a configuration of the coil the material consumption and the construction space can be optimized in the manufacture of the coil, thereby permitting a reduction of both the manufacturing costs of the coil and the manufacturing costs of the linear actuator in which the coil according to the invention is used.

BRIEF DESCRIPTION OF THE DRAWINGS

Preferred embodiments of the invention and further advantageous embodiments are explained in more detail with reference to the accompanying drawings. There are shown.

DETAILED DESCRIPTION

Figure 1:
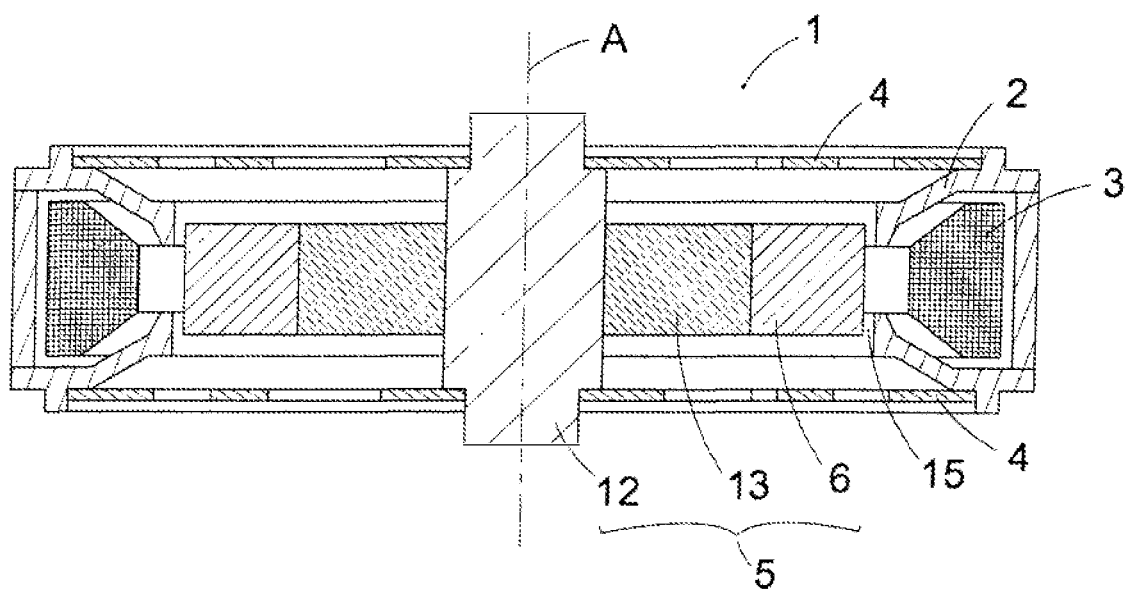
FIG. 1 a linear actuator with a solenoid-armature ram composite in a sectional representation.

In FIG. 1 a linear actuator 1 for an active engine mount, in particular for utilization in a vehicle engine, is represented by way of example. The linear actuator 1 has a stator 2 with a coil 3 that can be fed with electrical current for producing an electromagnetic field. Moreover, the linear actuator 1 has a solenoid-armature ram composite 5 that is movable along a longitudinal axis A of the coil 3. The solenoid-armature ram composite 5 comprises a ram 12 and a solenoid armature 6 surrounding the ram 12 in a ring shape, and a casting material 13 connecting the solenoid armature 6 with the ram 12. Preferably, plastics find application as the casting material 13, although also other materials can be used. An air gap 15 present between the solenoid armature 6 and the stator 2 influences the force generation of the linear actuator 1. For producing a high actuator force, a width of the air gap 15 is sought that is as small as possible. The stiffness of the linear actuator 1 is adjusted via two plate springs 4. For this purpose the two plate springs 4 are attached respectively to a step of the ram 12 and to the outside of the stator 2. The solenoid-armature ram composite 5 is thereby mounted in the stator 2 in axially movable manner.

The stator 2 has an axial cross-sectional profile that diminishes in the direction of the ram 12. Through such a configuration of the stator 2 and the arrangement of the plate springs 4 on the stator 2 a collision of the plate springs 4 with the stator 2 can be avoided and a linear actuator 1 can be created with a small solenoid-armature ram composite 5 and a large length of stroke. Accordingly, in the manufacture of the stator 2 of the linear actuator 1 only little material is required, whereby low material costs are incurred.

The coil 3 substantially enveloped by the stator 2 likewise has a cross-sectional profile that diminishes at least partly in the direction of the ram 12. A similar cross-sectional profile of the coil 3 and the stator 2 permits the integration of the coil 3 in the stator 2 while making optimal use of the space.

Figure 2:
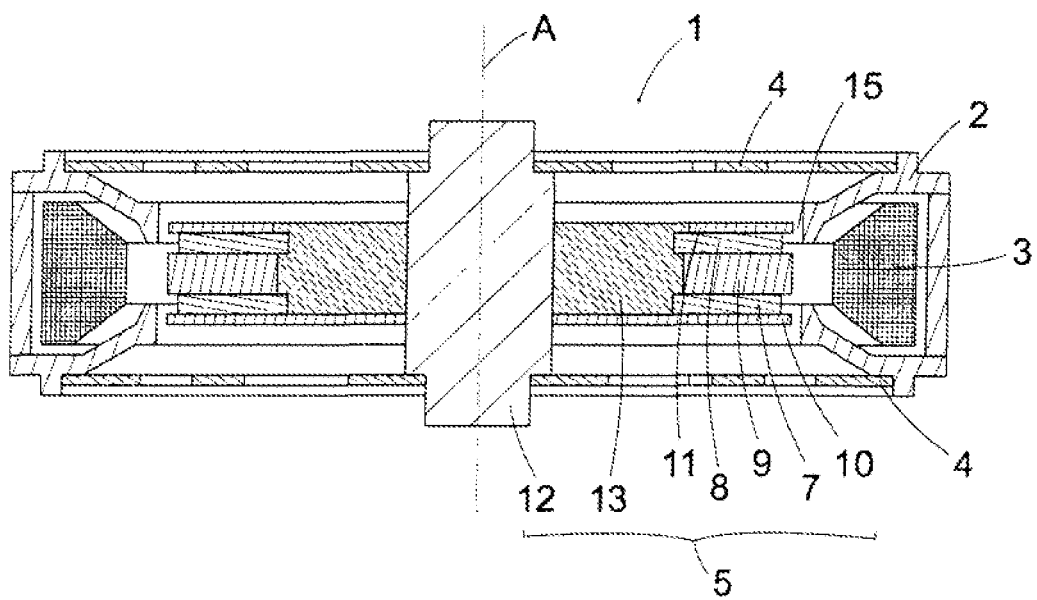
FIG. 2 a linear actuator with a solenoid-armature ram composite in a preferred embodiment in a sectional representation.

FIG. 2 shows the linear actuator 1 in a preferred embodiment. The annular solenoid armature 6 of the solenoid-armature ram composite 5 of the linear actuator 1 in this embodiment comprises a first and a second permanent magnet ring 7, 8, between which there is arranged an intermediate ring 9, and a first and a second pole disk 10, 11. The two pole disks 10, 11 respectively adjoin one of the two permanent magnet rings 7, 8 on the outer side in the axial direction, wherein the first pole disk 10 has a smaller inner diameter than the second pole disk 11 and is pressed onto the ram 2, for example.

The force level of the linear actuator 1 represented in FIG. 2, in addition to the fundamental dependence on the width and length of the air gap between the specified parts 9, 10, 11 of the solenoid armature 6 and the stator 2, is also dependent on the circumference on which the force is generated, i.e. in particular a respective outer diameter of the two pole disks 10, 11 and the intermediate ring 9, and on the volume of the two permanent magnet rings 7, 8.

To reduce the material consumption and as a consequence the material costs, the permanent magnet rings 7, 8 are dimensioned in the manner known to a person skilled in the art with regard to the $BH_{max}$ point of the specific material utilized, such that an inner diameter, an outer diameter and a thickness and accordingly a volume of the permanent magnet rings 7, 8 results. Both the two pole disks 10, 11 and the intermediate ring 9 are executed from at least one material of the group of magnetically soft materials, in particular from steel, whereas the two permanent magnet rings 7, 8 are executed from a material of the group of magnetically hard materials. Since components of magnetically soft materials can be produced more easily and more accurately than components of magnetically hard materials, the pole disks 10, 11 and the intermediate ring 9 in the embodiment shown have a larger outer diameter than the permanent magnet rings 7, 8, so that the air gap 15 present between the pole disks 10, 11 and the intermediate ring 9 and the stator 2 can have a particularly small width.

Figure 3:
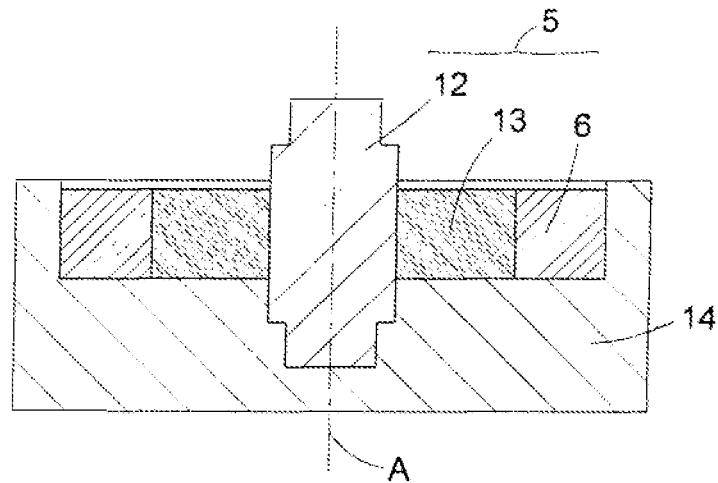
FIG. 3 a solenoid-armature ram composite in an assembly mold in a schematic sectional representation.

In FIG. 3 the solenoid-armature ram composite 5 is represented that can be manufactured in an assembly mold 14. For manufacturing the solenoid-armature ram composite 5 the solenoid armature 6 and the ram 12 are so arranged in the assembly mold 14 coated with a release agent that a radial gap remains between the solenoid armature 6 and the ram 12. An inner diameter of the assembly mold 14 and an outer diameter of the solenoid armature 6 are executed in mutually accurately fitting manner. The ram 12 is arranged in the center of the assembly mold 14 with respect to the outer diameter of the solenoid armature 6. The gap between the solenoid armature 6 and the ram 12 is cast with the casting material 13, so that the casting material 13 establishes a connection between the solenoid armature 6 and the ram 12. Through the casting of the gap with the casting material 13 an elaborate and cost-intensive working of the areas of the solenoid armature 6 facing the ram 12 and of the areas of the ram 12 facing the solenoid armature 6 can be omitted.

Figure 4:
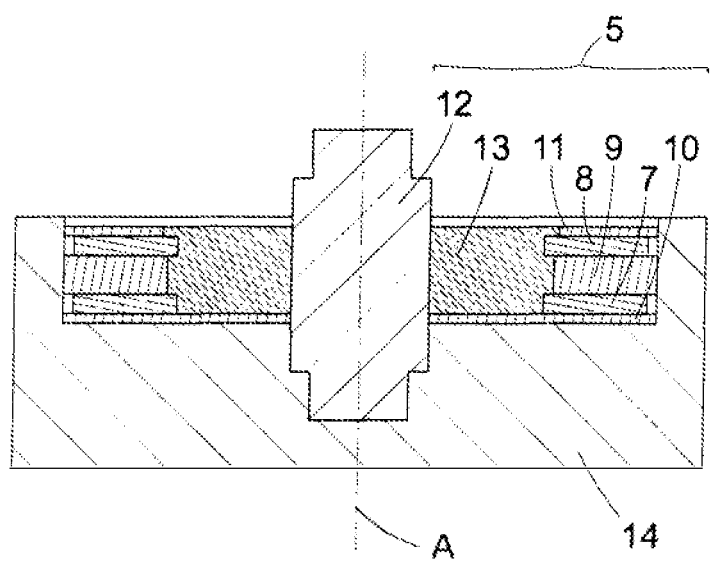
FIG. 4 a solenoid-armature ram composite in a preferred embodiment in an assembly mold in a schematic sectional representation.

In FIG. 4 the solenoid-armature ram composite 5 shown in FIG. 2 is represented in a suitable assembly mold 14. For manufacturing the specified solenoid-armature ram composite 5 the first pole disk 10 having a smaller inner diameter than the second pole disk 11 is pressed onto the ram 12. Thereby, the first pole disk 10 configured to expand over the full area from the inner diameter to the outer diameter serves as the bottom for the casting material 13. Alternatively, the first pole disk 10 can have a large inner diameter like the second pole disk 11, and the gap can be cast down to the bottom of the assembly mold 14. The outer diameters of the two pole disks 10, 11 and of the intermediate ring 9 are executed in accurately fitting manner with respect to an associated inner diameter of the assembly mold 14 and are oriented centered with respect to the longitudinal axis A, so that ultimately the air gap 15 represented in FIG. 2 has a very small width in order to produce an actuator force that is as great as possible. The outer diameter of the permanent magnet rings 7, 8 is selected to be slightly smaller in comparison, preferably in exactly such a manner that, uncritically with respect to tolerance, they still have an outer diameter that is as large as possible and accordingly a volume that is as large as possible. The second pole disk 11, the intermediate ring 9 and the two permanent magnet rings 7, 8 and the ram 12 are arranged in the assembly mold such that a radial gap is present between the specified parts 7, 8, 9, 11 and the ram 12, wherein the ram 12 is arranged in the assembly mold 14 in a manner as centered as possible. The gap between the parts 7, 8, 9, 11 and the ram 12 is cast with the casting material 13 in such a manner that the second pole disk 11, the intermediate ring 9 and the two permanent magnet rings 7, 8 are connected with the ram 12. Thereby, it is possible to omit an elaborate and cost-intensive working of the inner areas of the parts 7, 8, 9, 11 facing the ram 12 and of the outer areas of the magnetically hard permanent magnet rings 7, 8 which are more elaborate and difficult to work than the magnetically soft intermediate ring 9 and the magnetically soft second pole disk 11.

The invention claimed is:

1. A solenoid-armature ram composite for a linear actuator comprising:
a stator with a coil that can be fed with electrical current for producing an electromagnetic field and a single-part or multi-part solenoid armature movable along a longitudinal axis of the coil and a ram connected with the solenoid armature, wherein the solenoid armature surrounds the ram in a ring shape, wherein between the ram and the solenoid armature, a casting material is casted which connects the solenoid armature with the ram;
wherein the solenoid armature comprises a first permanent magnet ring and a second permanent magnet ring between which at least one intermediate ring is arranged;
at least one of the first permanent magnet ring and the second permanent magnet ring adjoins and contacts the casting material; and
the casting material has a smaller outer diameter than the first permanent magnet ring or the second permanent magnet ring.

2. The solenoid-armature ram composite according to claim 1, wherein the solenoid armature comprises at least both of one first pole disk and one second pole disk, wherein respectively one of the first pole disk and second pole disk adjoins one of the two permanent magnet rings on the outer side in the axial direction.

3. The solenoid-armature ram composite according to claim 2, wherein the first pole disk has a smaller inner diameter than the second pole disk, with which inner diameter the first pole disk adjoins the ram.

4. The solenoid-armature ram composite according to claim 2, wherein the permanent magnet rings have a smaller outer diameter than the pole disks and/or the intermediate ring.

5. The solenoid-armature ram composite according to claim 2, wherein the pole disks and/or the intermediate ring comprise at least one material of the group of magnetically soft materials.

6. A linear actuator with a solenoid-armature ram composite according to claim 1.

7. The linear actuator according to claim 6, wherein the ram is mounted on the stator in axially movable manner by plate springs.

8. The linear actuator according to claim 6, wherein the stator has an axial cross-sectional profile that is a cone-shaped cross-sectional profile, which diminishes at least partly in the direction of the ram.

9. The linear actuator according to claim 6, wherein the coil has an axial cross-sectional profile that is a cone-shaped cross-sectional profile, which diminishes at least partly in the direction of the ram.

\* \* \* \* \*